April 28, 1936.  R. S. QUICK  2,038,601
PUMPING SYSTEM
Filed Aug. 15, 1933   2 Sheets-Sheet 1

INVENTOR
Ray S. Quick
BY
Edward A. Hathaway
ATTORNEY

April 28, 1936.  R. S. QUICK  2,038,601
PUMPING SYSTEM
Filed Aug. 15, 1933   2 Sheets-Sheet 2

INVENTOR
Ray S. Quick
BY
Edward C. Hathaway
ATTORNEY

Patented Apr. 28, 1936

2,038,601

UNITED STATES PATENT OFFICE 2,038,601

PUMPING SYSTEM

Ray S. Quick, Burlingame, Calif., assignor to The Pelton Water Wheel Company, a corporation of California Application August 15, 1933, Serial No. 685,234

20 Claims. (Cl. 137—78)

This invention relates generally to pumping systems and more particularly to improved means for controlling the flow and pressure conditions in a pipe line whereby any pressure surges set up in the line, by closure of a check valve or failure of power will be effectively controlled by an improved and relatively simple surge suppressor.

Control of flow and pressure conditions in pumping systems is of vital importance in view of the very annoying if not serious consequences which may result under certain operating conditions particularly if pressure surges are set up. In order to have apparatus that is suitable to meet such conditions, it is highly desirable that the apparatus and controls therefor should be automatically responsive to these conditions with minimum possibility of failure and maximum effectiveness and simplicity. It is further desirable that such automatic operations should be highly flexible and yet entirely stable during operation and thoroughly reliable.

It is one object of my invention to provide an improved pumping system employing a pipe line having a pump and an improved check valve therein together with a bypass in which an improved surge suppressor valve is disposed. A further object is to so automatically coordinate these various elements that in the event of power failure to the pump motor the check valve will automatically close and upon occurrence of a down surge the surge suppressor automatically opens, after which the surge suppressor will gradually reclose with minimum possibility of excessive pressure rise in the line. This reclosing movement may if desired, and as specifically disclosed herein, be initiated during restoration of line pressure to normal conditions.

Another object is to provide an improved control for the surge suppressor valve whereby the valve will open rapidly upon an initial drop in pipe line pressure, such as might occur upon failure of the power to the pump motor, so that upon the return pressure surge the suppressor valve will be already open to permit discharge from the pipe line during which time the suppressor valve will be gradually closed by the pressure increase toward normal. In one aspect of the invention I have provided an improved pilot valve control for the suppressor valve whereby closing fluid pressure chamber for the suppressor valve is automatically drained upon the initial down surge and the drainage connection is automatically closed upon return of the pipe line pressure to near normal and more specifically I establish a restricted fluid flow to the closing chamber from the pipe line automatically upon closure of the drain by the pilot valve. This restricted passage is so arranged that it does not interfere with the rapid draining operation by the pilot valve and yet the pilot valve is so arranged and interconnected with the closing chamber that upon closure of the pilot valve the restricted orifice may fully function in its intended manner.

Other objects and advantages will be more apparent to those skilled in the art from the following description of the accompanying drawings in which.

Figures 1, 2:
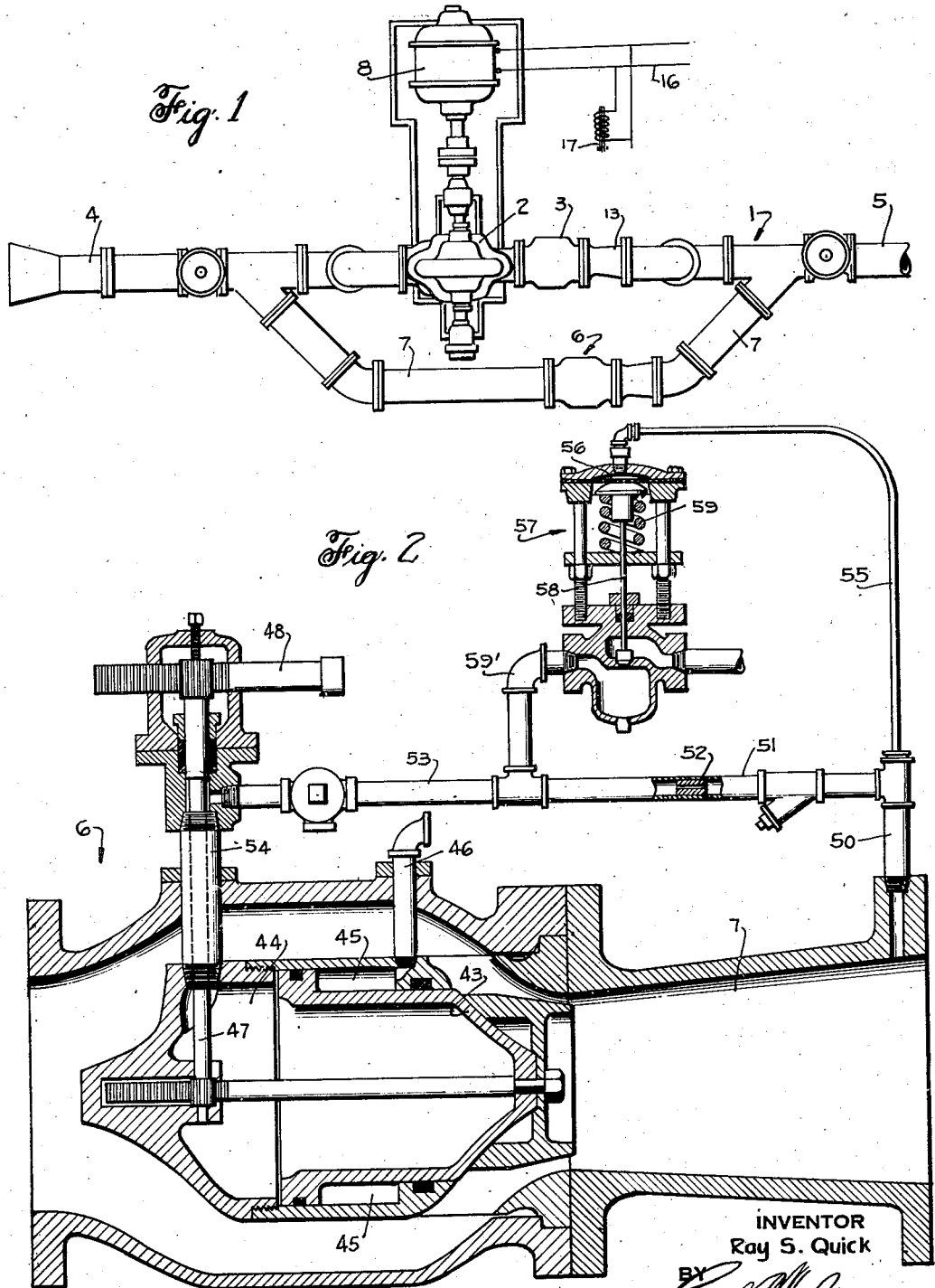
Fig. 1 is a diagrammatic plan view of a pumping system embodying my improved features.
Fig. 2 is a longitudinal sectional view through one form of suppressor valve together with the pilot valve control therefor although valves of forms other than shown may be employed.
Figure 3:
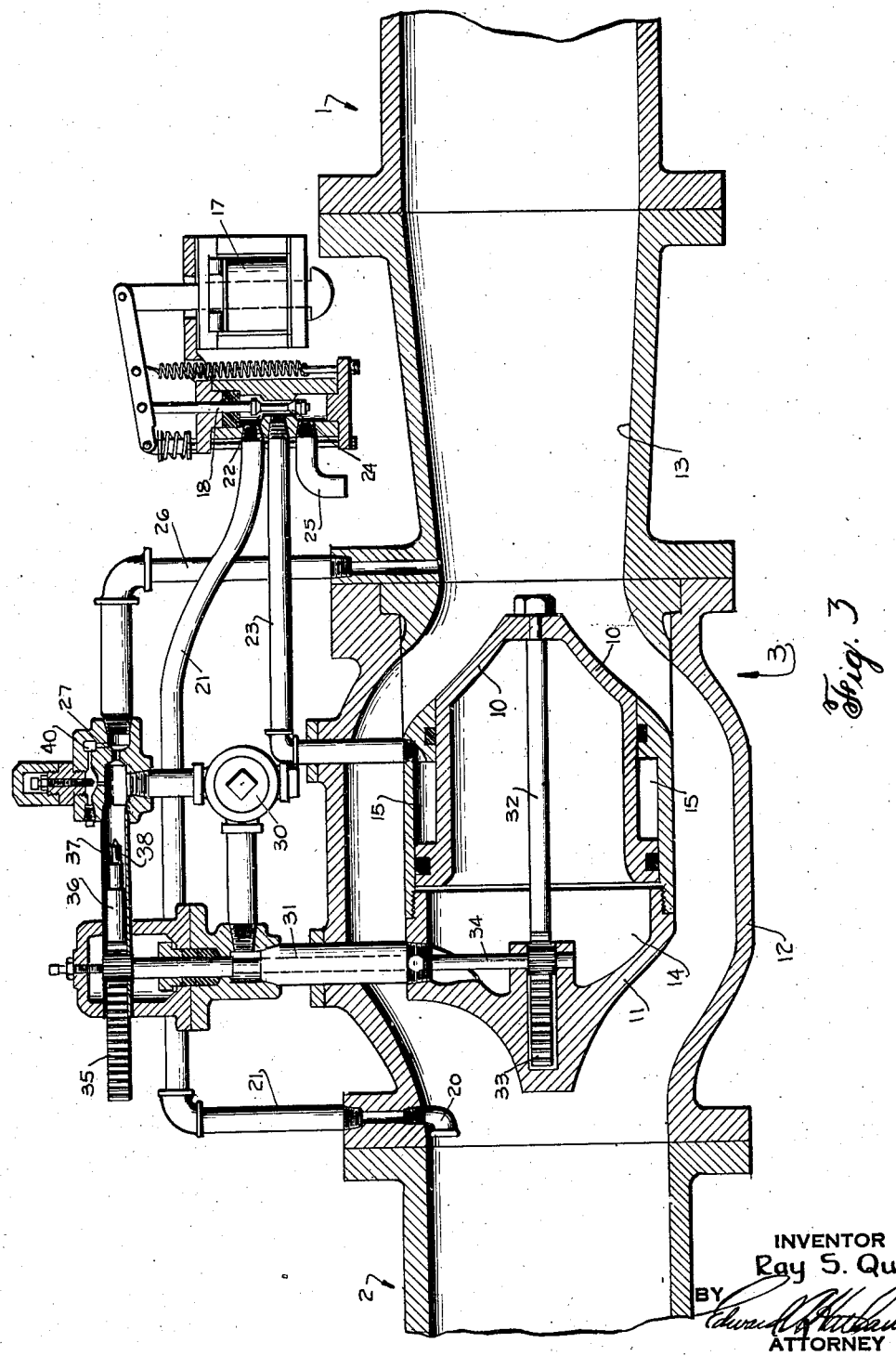
Fig. 3 is a longitudinal sectional view of the improved check valve employed in my system.

In the illustrated embodiment of my invention, which is shown herein merely for the purpose of disclosing one specific form among others that the invention might take, I have provided a pipe line generally indicated at 1 having a motor driven pump 2, such for example as a centrifugal pump and a check valve 3. The upstream or suction side 4 of the pipe line may be connected to any suitable source of fluid to be pumped while the downstream portion 5 of the pipe line may lead to any point of higher elevation or be connected to a water works system. The proper control of flow and pressure conditions in a water works system is of course of paramount importance because such a system usually employs a distribution network of several miles of piping although my improved system is applicable to any pumping system where similar flow and pressure problems are involved.

A surge suppressor valve generally indicated at 6 is placed in a bypass pipe 7, this bypass being connected into the pipe line on the downstream side of check valve 3 and on the upstream side of pump 2 which is driven by an electric motor 8.

Check valve.—The check valve may be of any suitable type having a movable valve element adapted to control flow of fluid through the pipe line. One specific form of valve that is very well adapted for check valve service is the Johnson type having a plunger 10 telescopically arranged in an internal casing disposed in spaced relation to an outer valve casing 12 thereby to provide an annular fluid passageway between the inner and outer casings. The valve is suitably disposed within the pipe line and preferably a Venturi passage 13 leads in a downstream direction from the valve. An internal closing chamber 14 and an opening annular chamber 15 are formed between the plunger and internal casing.

During normal pump operation current is supplied to pump motor 8 from a line 16 which also energizes a solenoid 17 to raise a control valve 18 to the position shown. This insures opening of the check valve by virtue of fluid pressure being transmitted from the discharge side of pump 2 through a Pitot tube 20, a pipe 21, an open valve port 22 and thence through pipe 23 to annular opening chamber 15 thereby to move plunger 10 in an opening direction and allow fluid flow through the pipe line. Hence it is seen that the pump must be operating to supply opening pressure for the check valve with the result that when the valve does open the pump pressure will prevent reverse flow therethrough.

In the event of power failure to the pump motor, solenoid 17 will be deenergized thereby causing valve stem 18 to move downwardly and close valve port 22 and open a valve port 24, whereupon annular chamber 15 is drained through pipe 23, valve port 24 and drain pipe 25 to the atmosphere. At the same time fluid pressure is supplied from the downstream side of the check valve through pipe 26, a restricted slow closure valve control 27, thence downwardly through a three-way manually operable valve 30 and thence over to a pipe 31 connected to the internal casing chamber 14.

To insure gradual closure of the check valve by a relatively simple means, I have provided a rod 32 secured to a plunger 10 and having a rack 33 at its outer end for engagement with a pinion shaft 34 extending upwardly through pipe 31 with ample clearance therewith. The upper end of shaft 34 carries a pinion for engagement with a rack 35 formed on the outer end of a plunger 36 which has a relatively close sliding fit with a pipe 37. This pipe communicates with the restricted closure port 27 and has a reduced throttling needle valve 38 adapted to be moved within port 27 when plunger 10 is near its closed position, thereby to further restrict fluid flow through port 27 and hence retard the final closing movement of plunger 10. If desired needle 38 may have a close sliding fit with port 27 in which case fluid flows around port 27, through an adjustable bypass 40.

*Surge suppressor.*—As shown in Fig. 2 the surge suppressor generally indicated at 6 is of the same general type of valve specifically shown for the check valve except that the control mechanism is so arranged as to employ the valve as a surge suppressor. For example, the plunger 43 has an internal closing chamber 44 and an annular chamber 45 which is preferably constantly drained to the atmosphere through a pipe 46. Hence other types of valves having merely a closing chamber would suffice although this particular type of valve has certain advantages over other usual gate valves or the like. The pinion shaft 47 is employed to actuate a valve position indicator 48 and hence need not be described further. Normally valve 43 is held in its closed position during substantially normal pressure conditions in the pipe line, this pressure being transmitted from the pipe line at a point downstream from the check valve through pipes 50 and 51, restricted orifice 52, and thence through pipes 53 and 54 to closing chamber 44. This pressure is also transmitted through a pipe 55 to a suitable pressure chamber 56 of a pilot valve generally indicated at 57, thereby to move the pilot valve element 58 downwardly against the constant upward force exerted by a spring 59. Downward movement of valve stem 58 closes a discharge passage 59' connected into pipe 53 on the left side of restricted orifice 52.

*Operation.*—In the event of power failure or if for any other reason the pressure head at the source should suddenly fail, then the pipe line fluid continues or tends to continue to flow in its original direction. This creates a pressure drop materially below normal followed by a return pressure surge and, under certain conditions, by a reversal of flow in the pipe line. However, in either event it is desired to close the check valve 3 and open the suppressor valve 6 on the down surge of pressure followed by reclosure of the surge suppressor after the return surge, although sometimes the gradual reclosure of the valve may start during the return surge. Thus the suppressor valve is already opened when the return surge occurs thus providing a substantially free discharge passage for the pipe line fluid to avoid an excessive pressure rise. By gradual reclosure of the suppressor valve after this return surge, proper control of the pressure in the pipe line may be effected without further pressure surges. Closure of the check valve, during such drop in pressure, has occurred due to the deenergization of solenoid 17 by power failure. Drop of the pipe line pressure will permit spring 59 and pilot valve 57 to open drain pipe 59' and thus allow free discharge of fluid flow from closing chamber 44 through pipes 54, 53, and 59' to the atmosphere. Passage 52 will suitably restrict unnecessary fluid flow through pipes 50 and 51. Immediately upon reduction of pressure in closing chamber 44, the pipe line pressure on the downstream side thereof acting on the face of the plunger will move the same to its open position. The fluid pressure on the face of the plunger for opening the same may be the subnormal pipe line pressure but this low pressure will nevertheless be greater than the atmospheric pressure in chamber 44 and hence the valve will open. As a result the suppressor valve can be readily opened on the down surge in the pipe line so that upon the return surge a free outlet is provided through pipe 7 which drains back into the inlet 4. After the return surge or possibly slightly during the return surge, fluid flows through pipes 50 and 55 to move pilot valve stem 58 down against the action of spring 59, thereby to close drain pipe 59'. This action of the pilot will take place relatively quickly in response to the return of substantially normal pressure in the pipe line depending upon the adjustment of spring 59, although the flow of actuating fluid through pipes 50—54 to the closing chamber 44 of plunger 43 will be appreciably restricted by throttle passage 52 thereby causing gradual closure of the valve without creating an excessive pressure rise in the system.

Hence it is seen that I have provided an extremely simple and yet highly effective means whereby upon failure of power the pipe line is automatically closed by the check valve and upon occurrence of pressure surge conditions due to closure of the check valve or failure of the power, the surge suppressor is automatically and rapidly opened on the down surge to be already open when the return surge occurs after which the valve is gradually reclosed to bring the system to static balance.

It will of course be understood by those skilled in the art that various changes may be made in the details of construction and arrangement of parts without departing from the spirit of the invention as set forth in the appended claims.

I claim:

1. A pumping system comprising, in combination, a pipe line having a pump and a check valve, a bypass around said pump and check valve, and a surge suppressor in said bypass adapted to control pressure surges in said pipe line upon closure of said check valve, said suppressor having means for effecting its opening automatically upon occurrence of a down surge in said pipe line so as to permit free flow through said bypass upon the return surge, and means for gradually reclosing said suppressor to prevent excessive pressure rises in said pipe line.

2. A pumping system comprising, in combination, a pipe line; a motor driven pump, a check valve and a suppressor valve all associated with said pipe line; means for automatically closing said check valve upon failure of power to said pump whereby a down surge in said pipe line is followed by a return surge; means whereby said suppressor is opened by fluid pressure automatically upon occurrence of said down surge so as to be already open when the return surge occurs; and means whereby said suppressor is thereafter closed by fluid pressure.

3. In combination with a pipe line in which a down surge in pressure is followed by a return pressure surge, a suppressor valve for controlling said return surge, said valve having a movable valve element and means providing a fluid pressure closing chamber therefor, actuating means for opening said valve, a pilot valve, and a drain passage controlled thereby and communicating with said chamber, said pilot valve being connected to said pipe line and responsive to a down surge therein to open said drain passage and relieve pressure in said closing chamber whereupon said actuating means opens said suppressor valve to provide free flow therethrough during the return surge, and said pilot valve being further responsive after said down surge to close said drain and effect closure of said suppressor valve.

4. In combination with a pipe line in which a down surge is followed by a return surge, a surge suppressor communicating with said pipe line and having a valve member, means for opening and closing said valve by fluid pressure, and a pressure actuated pilot valve adapted to control the operating pressure for said suppressor valve, said pilot valve being controlled by the down surge in pressure thereby to effect opening of said valve member to provide a free passage for the return surge, and said pilot valve responding to a pressure rise in said pipe line to effect reclosure of said suppressor valve.

5. In combination with a pipe line in which a down surge in pressure is followed by a return surge, a surge suppressor valve communicating with said pipe line to permit discharge therefrom and having provision for being moved to open and closed positions by fluid pressure, a pilot valve for controlling release of the closing pressure on said suppressor valve and a restricted passage through which the closing pressure is supplied to the suppressor valve, and means whereby said pilot valve responds to the down surge to effect opening of said suppressor valve thereby to provide a free outlet for the return surge, and said pilot valve further responds to an increase in pressure to near normal for effecting closure of said suppressor valve by fluid supplied through said restricted passage.

6. The combination set forth in claim 5 further characterized by the provision of means for supplying a closing fluid pressure from said pipe line through said restricted passage to said suppressor valve to close the same.

7. In combination with a pipe line in which a down surge in pressure is followed by a return surge, a surge suppressor valve communicating with said pipe line and adapted to be opened and closed by fluid pressure therein, a passageway allowing communication between said pipe line and the closing side of said suppressor valve and having a restricted orifice through which the fluid must flow, a pilot valve controlled drain communicating with said passage at a point between said restricted orifice and suppressor valve, and means for controlling said pilot valve by fluid pressure from said line whereby upon the down surge in pressure said pilot valve effects discharge of closing pressure fluid on said suppressor valve thereby to effect opening of the same to provide a free outlet for the return surge, and said pilot valve reclosing when the pipe line pressure is restored to near normal thereby causing pipe line fluid to flow through said orifice and effect gradual closure of said suppressor valve.

8. In combination with a pipe line in which a down surge in pressure is followed by a return surge, a surge suppressor valve, means whereby said valve is adapted during the down surge to be opened by the fluid pressure existing in said line during the opening period of said valve, and means for subsequently reclosing said suppressor valve automatically when the pipe line pressure is restored to near normal.

9. In combination with a pipe line in which a down surge in pressure is followed by a return surge, a surge suppressor valve, means whereby said valve is adapted during the down surge to be opened by the fluid pressure in said line, and means for subsequently reclosing said suppressor valve by fluid pressure automatically when the pipe line pressure is restored to near normal, said latter means including a passage having a restricted orifice through which closing fluid pressure from the pipe line is adapted to have constant communication with the suppressor valve at all times.

10. A pumping system comprising, in combination, a pipe line having a check valve and a prime mover operated pump for pumping fluid through said line, means for effecting closure of said check valve automatically upon power failure to said pump including fluid pressure opening and closing chambers for said check valve, a passage through which fluid pressure is supplied to said closing chamber, means for automatically restricting said passageway when said check valve reaches a predetermined closed position, a passage through which fluid pressure is supplied to said opening chamber, and a valve in said latter passage for directly controlling the supply of fluid to said opening chamber.

11. A pumping system comprising, in combination, a pipe line having a check valve and a prime mover operated pump, means for effecting closure of said check valve automatically upon power failure to said pump including fluid pressure opening and closing chambers for said check valve, a passage through which fluid pressure is supplied to said closing chamber, means for automatically restricting said passageway when said check valve reaches a predetermined closed position, an adjustable bypass around said restricted portion of said passage, a passage through which fluid pressure is supplied to said opening chamber, and a valve in said latter passage for directly controlling the supply of fluid to said opening chamber.

12. In combination with a pipe line in which a down surge is followed by a return surge, said pipe line having a relief aperture, a valve normally closing said aperture during normal flow conditions in said pipe line, means whereby said valve is moved to open position by power, and control mechanism for initiating opening movement of the valve by said power means during a down surge whereby said valve is open in advance of a rise in pressure therein above normal thereby to provide a free discharge for the return surge.

13. In combination with a pipe line in which a down surge in pressure is followed by a return pressure surge, a suppressor valve for controlling said return surge, said valve having a movable valve element for normally closing a relief aperture in said pipe line, means whereby said valve is moved in an opening direction by fluid pressure, and pilot control means adapted upon operation to effect opening of said valve by fluid pressure in advance of a return surge above normal pressure thereby to provide a free outlet for the return surge.

14. In combination with a pipe line in which a down surge in pressure is followed by a return pressure surge, a suppressor valve for controlling said return surge, said valve having a movable valve element for normally closing a relief aperture in said pipe line, and means for opening said valve during a period of subnormal pressure within said line thereby to provide a free discharge for the return surge and for thereafter automatically closing said valve, said means including fluid pressure means for moving the valve to its closed position and a pilot valve for controlling fluid pressure supply to said closing means.

15. In combination with a pipe line in which a down surge in pressure is followed by a return pressure surge, a suppressor valve for controlling said return surge, said valve having a movable valve element for normally closing a relief aperture in said pipe line, means whereby said valve is moved in both opening and closing directions by fluid pressure, and fluid control pilot mechanism for effecting opening and closing of said valve automatically in accordance with surge producing conditions whereby said valve is opened during a period of subnormal pressure within said line to provide a free discharge outlet for the return surge and is thereafter closed during restoration of normal conditions.

16. In combination with a pipe line in which a down surge in pressure is followed by a return surge, a surge suppressor valve, means whereby said valve is opened in response to a down surge thereby to provide a free discharge outlet for the return surge, and means for thereafter reclosing said suppressor valve automatically during restoration of normal pressure conditions, said latter means including a fluid pressure closing chamber for said valve and means for supplying a restricted flow of fluid to said chamber to effect a gradual reclosure of said valve.

17. A pumping system comprising, in combination, a pipe line having a check valve and a prime mover operated pump, means providing fluid pressure opening and closing chambers for said check valve, means for supplying fluid pressure to said chambers, and means for effecting closure of said check valve automatically upon power failure to said pump including a pilot valve for shutting off supply to said opening chamber and relieving fluid pressure therein.

18. A pumping system comprising, in combination, a pipe line having a check valve and a prime mover operated pump, means providing fluid pressure opening and closing chambers for said check valve, means for supplying fluid pressure to said chambers, and a pilot valve for controlling fluid pressure in said opening chamber automatically in accordance with predetermined pumping conditions.

19. The combination set forth in claim 18 further characterized in that fluid pressure is constantly supplied to said closing chamber whereby closure and opening of said valve are effected by the supply of fluid to said opening chamber or the discharge of fluid therefrom.

20. A pumping system comprising, in combination, a pipe line having a check valve and a prime mover operated pump, means for effecting closure of said check valve automatically upon power failure to said pump including fluid pressure closing means for said check valve, a passage through which fluid pressure is supplied to said closing means, control valve mechanism located externally of said valve, and means operatively connecting said check valve with said control valve for automatically restricting said passage when said check valve reaches a predetermined closed position.

RAY S. QUICK.

CERTIFICATE OF CORRECTION.

Patent No. 2,038,601. April 28, 1936.

RAY S. QUICK.

It is hereby certified that error appears in the printed specification of the above numbered patent requiring correction as follows: Page 1, first column, line 3, for "bow" read flow; and that the said Letters Patent should be read with this correction therein that the same may conform to the record of the case in the Patent Office.

Signed and sealed this 11th day of August, A. D. 1936.

Henry Van Arsdale (Seal) Acting Commissioner of Patents.